2,944,906

MAYONNAISE PRODUCT AND METHOD OF MANUFACTURE

Joseph George Spitzer, Mamaroneck, Leo S. Nasarevich, Jackson Heights, Joseph L. Lange, Farmingdale, and Henry S. Bondi, Elmhurst, all of New York, assignors by direct and mesne assignments, to Carter Products, Inc., New York, N.Y., a corporation of Maryland No Drawing. Filed Dec. 23, 1957, Ser. No. 704,299

6 Claims. (Cl. 99—144)

This invention relates to mayonnaise-like products with normal mayonnaise characteristics but containing a lower level of edible oils normally used in the manufacture of mayonnaise.

The usual mayonnaise products are semi-solid emulsions of edible oils in an amount at least 65% by weight, an egg material such, for example, as egg yolk, flavoring agents such, for example, as vinegar and/or lemon juice and water. Usually the emulsifying agent for mayonnaise emulsion is a constituent of the egg material or the combination thereof with an added emulsifying agent. Seasoning agents are usually incorporated such, for example, as salt, spices, sugar, dextrose, etc.

A typical formulation for conventional mayonnaise products would be edible oil 70%, egg yolk 10%, vinegar 10%, water 5%, salt and spices. In a typical manufacturing method of the prior art, the edible oil is slowly added to previously homogenized egg yolk. The salt and spices are dissolved in the water phase and the resulting solution, together with the vinegar is slowly added to the oil and egg yolk mixture under constant agitation and the entire mass is then fed through a homogenization unit.

The usual mayonnaise products of the prior art possess many disadvantages. The resulting products of the prior art methods of manufacture are of very unstable nature, whose external phase is water plus vinegar plus other electrolytes and whose internal phase comprises oil, plus lipids and egg lecithin. The egg lecithin acts as an emulsifying agent in the system serving to reduce the surface tension of the edible oil, i.e. the internal phase but having no effect on the external phase. Because of the unstable nature of such oil in water emulsions separation difficulties are encountered such as in transportation, changes in climatic conditions, etc.

Moreover, the usual mayonnaise products containing a high level of high caloric oil are of high caloric content. Hence, their use must be avoided by people requiring a low caloric intake, such as those suffering from gastric and intestinal disturbances, heart disorders, overweight, etc. Also, the conventional mayonnaise products are relatively expensive because of the relatively high price of the oils contained therein.

Efforts to overcome the disadvantages of the usual mayonnaise products have been met with many difficulties. First of all, since known mayonnaise products are unstable emulsions even slight changes in ingredients or in proportions often cause a complete separation and destruction of the emulsion. For example, mayonnaise products prepared in accordance with the prior art processes described hereinabove in general contained no more than about 15% water and usually the amount of water was limited to about 12% to about 14.5% by weight since above that amount the emulsion was rendered unstable and separation of the water took place. It is seen, therefore, in attempting to produce a mayonnaise product of lower oil content than conventional mayonnaise one would not simply arrive at the desired product by merely decreasing the amount of oil since this would simultaneously increase the amount of water to a point causing the separation of the desired emulsion.

In addition to the foregoing, there are many other obstacles confronting one desiring to produce a mayonnaise-like food product of lower oil level and correspondingly lower caloric content than normal mayonnaise but yet possessing the characteristics of normal mayonnaise. For example, in certain instances, substituting a lower caloric bodying agent such, for example, as starch, for some of the edible oil normally used results in a product having a fairly good texture but unsatisfactory flavor. On the other hand, substituting gums like pectin, gum tragacanth, methocel, etc., for a portion of edible oil normally used gives a product having a satisfactory flavor but poor mayonnaise-like texture.

Accordingly, it is an object of this invention to provide novel mayonnaise-like food products having the characteristics of normal mayonnaise but having a lower level of edible oil than is normally used in the manufacture of mayonnaise by the prior art methods.

A further object of this invention is to provide novel mayonnaise-like food products having the characteristics of the known mayonnaise emulsions but which are more stable.

A still further object of this invention is to provide novel mayonnaise-like food products having the characteristics of normal mayonnaise but which are of low caloric content.

Yet a further object of this invention is to provide novel mayonnaise-like food products having the characteristics of normal mayonnaise but which is less expensive to manufacture than the usual mayonnaise products produced by the prior art methods.

Another object of this invention is to provide a novel method for manufacturing mayonnaise-like food products having the attributes set forth in the foregoing objects.

It has been discovered that the above objects may be accomplished by (1) forming a hot mix by combining edible oil, a gel forming stiff gum, an egg yolk containing material, an acidifying agent and water at a temperature above the hydrating temperature of the stiff gum, the proportions of the ingredients being such to yield a gel on cooling; (2) cooling the hot mix to the hydrating temperature of the stiff gum to form a gel; and (3) breaking down the gel into an oil in water emulsion wherein the oil phase comprises oil droplets of fine particle size. Preferably, the oil in water emulsion is formed by processing the gel through a Manton-Gaulin homogenizer at 500–3000 p.s.i. The resulting product formed in accordance with the above method is a fine mayonnaise-like product with arrested flow and easy melting in the mouth. In general, the gel strength of the gel formed in accordance with this invention before it is broken down is in a range of from about 50 to about 600 determined by the Japanese Pharmacopeia method. The viscosity of the finished product formed in accordance with this invention is in general in the range between about 400 and about 25, determined on the K.I.C. penetrometer at 25° C. using 32 mm. aluminum cone weighing 6.4 grams.

The ingredients employed in forming the hot mix may be combined in a number of different ways. In one modification, an oil base and a water base are prepared separately and then combined to form the hot mix. In this procedure, the oil base is prepared similar to that in ordinary mayonnaise by emulsifying edible oil, egg yolk, flavoring agent such, for example, as lemon juice and vinegar in water at ordinary temperatures. Separately, a water base is prepared by adding the stiff gum to water below the hydration temperature of said gel-forming gum. The temperature is then raised above the hydration temperature of the stiff gum causing it to go into solution. The oil base is then added to the water base and mixed thoroughly by agitation until the mixture is homogeneous. On cooling the desired gel is formed.

Preferably, a soft gum is employed in combination with the stiff gum to improve the smoothness, oiliness and appearance of the final product. In such instance, in preparing the above described water base for subsequent mixture with the oil base, the stiff gum and soft gum are added to water at a temperature below the hydration temperature of the gel forming gum but above the solution point of the soft gum. At this temperature the soft gum is insoluble because the temperature is too high while the stiff gum is insoluble because the temperature is too low. The temperature is then raised above the hydration temperature of the stiff gum causing it to go into solution while the soft gum remains insoluble. The oil base is then added to the water base and mixed thoroughly by agitation until the mixture is homogeneous. On cooling the soft gum goes into solution and the desired gel is formed on gelling of the stiff gum.

In a preferred modification, all of the ingredients may be mixed in the same container in contrast to the two phase procedure described above. In this modification, the combination of gums are added to water at a temperature above the hydration temperature of the stiff gel forming gum. The temperature is then lowered to a temperature at which egg yolk will not coagulate. Egg yolk coagulates at about 140° C. and above. An emulsifying agent is then added followed by the addition of egg yolk, edible oil and flavoring agents such, for example, as lemon juice and vinegar, in that order. The resulting mixture is further agitated until it is homogeneous. On cooling the desired gel is formed.

A preferred combination of gums useful in forming a hot mix in accordance with this invention is agar-agar, a stiff gel forming gum, and methocel, a soft non-gel forming gum. Agar-agar is quite insoluble in the cold, begins to dissolve in the vicinity of 90° C. and completely goes into solution and hydrates on boiling. On cooling the hydrated material forms a gel. Methocel on the other hand, is soluble in the cold, begins to lose its solubility around 50° C. and becomes quite insoluble at higher temperature. Accordingly, in forming the hot mix, if both of these gums are added at a medium temperature, e.g. 75° C., they both remain insoluble and rapidly dispensed producing a uniform mixture. If the mixture is brought to a boil, the agar-agar dissolves completely while methocel dissolves during the cooling process. Since agar-agar gels below 40° C. a temperature range between 55° C. and 35° C. is quite sufficient for the methocel to go in solution and produce a perfectly uniform product.

As indicated hereinbefore, the hot mix on cooling forms a gel which when broken down into fine particles produces a fine mayonnaise-like product with arrested flow and easily melting in the mouth. Any suitable procedures may be used for effectuating the required cooling step to form the gel and subsequent breaking down thereof. Excellent results have been obtained by running the hot mix over a "gelatine flaker" drum. This procedure produces gel-flakes which are suitable for direct feed into a homogenizer. The flaker drum simultaneously cools, gels and flakes the hot mix. The mashed gel in the form of flakes is then broken up into fine particles by suitable means such, for example, as a colloid mill or a homogenizer such as a Manton-Gaulin homogenizer, resulting in a fine mayonnaise-like product. Samples of mayonnaise-like products prepared in the above described manner appeared to be in good condition even after a year's time in the incubator (37° C.).

In the preparation of the hot mix, it has been found that the following ingredients in the indicated amounts are essential for producing suitable mayonnaise-like products by the teachings of this invention:

| Ingredient | General Proportion Range, Percent Wt. | Preferred Prep. Range, Percent Wt. |
|---|---|---|
| Edible Oil | 1–80 | 5–30 |
| Egg Yolk Containing Ingredient | 2.0–15 | 1–7 |
| Stiff Gel Forming Gum | 0.25–3.0 | 0.5–2.5 |
| Soft Non-Gel Forming Gum | 0–4 | 0.25–3 |
| Acidifying Agent (Pure Acid) | 0.5–3 | 0.1–1.5 |
| Water | Q.S. 100 | Q.S. 100 |

With respect to the above general recipe, any suitable winterized vegetable salad oil may be used in forming the mayonnaise-like products of this invention. Examples of such oils are vegetable oils such, for example, as cotton seed oil, corn oil, olive oil and like edible oils. The oil should be in an amount sufficient to form a firm gel when combined with the other ingredients in accordance with the teachings of the present invention which is generally in an amount from 1 to 80% by weight of the total composition. For low calorie mayonnaise products a low level of oil should be used preferably in an amount from 5 to 30% by weight of the total composition.

As indicated heretofore, the gel strength of the gel formed in accordance with this invention is in general in the range between 50 and 600, determined by the Japanese Pharmacopeial method. Moreover, the viscosity of the finished product is in general in the range between about 400 and about 25, determined on the K.I.C. penetrometer at 25° C. using 32 mm. aluminum cone weighing 6.4 grams. Accordingly, any edible stiff gel-forming gum which produces a gel and final product having a gel strength and viscosity, respectively, within the above indicated ranges may be used for imparting the required body and texture to the final product.

The stiff gum should be in an amount sufficient to form a firm gel when the hot mix is cooled in accordance with the teachings of the invention. It should not be in an amount so great as to render the finer product hard and brittle. In general, the stiff gel is in an amount from 0.25 to 3.0% by weight and preferably 0.5 to 3% by weight. In addition to agar-agar, examples of other stiff gums which may be useful in this invention include pectins, preferably between 50 and 300 grade; viscarins, preferably those whose viscosities of 1% solutions at 25° C. may be between 100 and 500 c.p.s.; gelcarins, preferably those whose 1.5% solutions tested by Bloom gelometer range between 10 and 500 grams; alginates, preferably those whose viscosities of 1% solutions at 25° C. vary betwen 10 and 2000 cps.; Kelco gums, preferably those whose viscosities of 1% solutions at 25° C. vary between 30 and 500 cps. and Kelcosol whose viscosities may be as high as 2500 cps.; and, carrageenates, preferably those whose viscosities of 1% solutions vary between 20 and 400 cps.

The water used in accordance with this invention must be in an amount sufficient to hydrate the stiff gum to form the desired gel. Of course, the amount of water present varies depending upon the amount of the remaining components that is present; the water being in an amount sufficient to make a 100% by weight composition.

As indicated heretofore, the novel products of this invention contain a soft gum. The soft gum should be in an amount sufficient to impart to the final product a smooth, oily feel and appearance but less than that which detracts from the mayonnaise-like taste of the final product. In general, the soft gum is in an amount from 0 to 4% by weight, and, preferably, 0.25 to 3% by weight of the total composition. Examples of suitable soft gums which may be employed are gum tragacanth, preferably those grades whose viscosities of 1% solutions at 25° C. vary between 50 and 1500 cps.; gum guar, preferably those grades whose viscosities of 1% solutions at 25° C. vary between 50 and 350 cps.; locust bean gum, preferably those grades whose viscosities of 1% solutions vary between 50 and 500 cps.; methyl cellulose, preferably those grades whose viscosities of 2% solutions at 28° C. vary between 10 and 9000 cps.; hydroxethyl cellulose, preferably those lower grades whose viscosities in 5% solutions at 20° C. vary between 70 and 30,000 cps. and higher grades whose viscosities of 2% solutions at 20° C. vary between 3000 and 5000 cps.; sodium salt carboxymethyl cellulose, preferably those low and medium grades whose viscosities of 2% solutions at 25° C. vary between 25 and 600 cps. and higher grades whose viscosities of 1% solutions at 25° C. vary between 1300 and 2200 cps.; and, specially treated starches, such, for example, as that manufactured by National Starch Products and sold under the trade name "SDW" starch.

In order to obtain a mayonnaise-like product, it is essential that the compositions of this invention contain an egg yolk containing material. The egg yolk containing material improves the mayonnaise-like flavor and appearance of said compositions. Examples of such materials are liquid egg yolk, frozen egg yolk, liquid whole eggs, frozen whole eggs, or any of the foregoing in combination with liquid or frozen egg white. In general, the egg yolk containing material is in an amount from about 2.0 to about 15% by weight, and, preferably, 1 to 7% by weight.

The compositions of this invention also contain an acidifying agent for improving the mayonnaise-like flavor thereof. Examples of such compounds for this purpose are vinegar, acetic acid, citric acid and lemon juice. In general, the acidifying agent based on pure acid is in an amount from about 0.5 to about 3% by weight, and, preferably, 0.1 to 1.5%.

If so desired, other additives conventionally used in mayonnaise products may be used such, for example, as sorbic acid, sodium benzoate, "Sustaine 6," stearine flakes, hydrogenated fats and oils.

Specific examples of mayonnaise type food products prepared in accordance with this invention are as follows:

*Example I*

| Ingredient: | Percent by weight |
|---|---|
| Vegetable oil | 15.0 |
| Vinegar | 10.0 |
| Egg ingredients | 6.0 |
| Salt | 2.5 |
| Flavors | 0.5 |
| Gum karaya | 1.0 |
| Alginates | 2.0 |
| Water, q.s. | 100 |

*Example II*

Ingredient:
| Vegetable oil | 17.0 |
|---|---|
| Vinegar | 7.0 |
| Egg ingredients | 7.0 |
| Salt | 3.0 |
| Flavors | 0.6 |
| Agar-agar | 2.0 |
| Water, q.s. | 100 |

*Example III*

Ingredient:
| Vegetable oil | 16.0 |
|---|---|
| Vinegar | 9.0 |
| Egg ingredients | 3.0 |
| Salt | 3.0 |
| Lemon juice | 1.5 |
| Flavors | 0.4 |
| Agar-agar | 1.5 |
| Methocel | 0.5 |
| Water, q.s. | 100 |

*Example IV*

Ingredient:
| Vegetable oil | 17.0 |
|---|---|
| Vinegar | 8.0 |
| Egg ingredients | 5.0 |
| Salt | 2.0 |
| Kaolin | 1.0 |
| Starch | 2.5 |
| Flavors | 0.6 |
| Water, q.s. | 100 |

*Example V*

As an illustrative example, excellent results have been secured by preparing the hot mix of the following ingredients and in substantially the following proportions:

| | Percent by wt. |
|---|---|
| Juni agar | .08 |
| Agar | .67 |
| Methocel | .16 |
| Alginate derivative | .83 |
| Starch | 3.00 |
| Salt | 2.50 |
| Mustard flour | .12 |
| Onion powder | .15 |
| Garlic powder | .12 |
| Sodium benzoate | .12 |
| Sorbic acid | .15 |
| Saccharin | .033 |
| Lemon juice concentrate | 1.25 |
| 50-grain cider vinegar | 3.17 |
| 100-grain white vinegar | 1.58 |
| Winterized cottonseed oil | 12.00 |
| Egg yolks, salted | 5.50 |
| Antioxidant | .06 |
| Water | 68.507 |
| | 100.000 |

A mayonnaise-like product having the above recipe may be prepared as follows:

The composition represented by the above recipe is completely processed in a Groen kettle with auxiliary agitator removed. In the first step of the processing, 2.8 lbs. of Juni agar are slowly added to 75 gallons of water. The resulting mixture is agitated until the Juni agar is evenly dispersed throughout the water (e.g., 1 to 2 minutes). To the resulting dispersion is added 105 lbs. of starch and the resulting mixture is agitated until all of the starch lumps are dispersed. 100 gallons of water are then added and the resulting mixture is heated by means of steam. When the temperature of the mixture reaches 145° F., there is slowly added thereto 23.45 lbs. agar, 5.6 lbs. of Methocel 90, 87.5 lbs. of salt, 4.20 lbs. of mustard flour, 5.25 lbs. of onion powder, 4.20 lbs. of garlic powder, 4.20 lbs. of sodium benzoate, 5.25 lbs. of sorbic acid and 1.81 lbs. of saccharin. The resulting mixture is then heated to 192° F. and held at a temperature between 193° F. and 197° F. for about five minutes. To the resulting mixture is added 116.5 gallons of water and the mixture is cooled to 110° F. To this mixture is added 110.95 lbs. of cider vinegar, 55.30 lbs. of white vinegar and 43.75 lbs. of lemon juice. The mixture is cooled to 90° F. and 192.5 lbs. of egg yolk and 1.5 lbs. of antioxidant are added thereto and mixed therewith for 5 minutes. 420 lbs. of winterized cottonseed oil and 29.05 lbs. of alginate derivative are then mixed and this mixture is then slowly added to the above batch mixture and the resulting mixture agitated until the oil is well dispersed. When the agitation is stopped a gel is formed on standing which is pumped to a holding tank. The gel is then processed through a Manton-Gaulin homogenizer at 750 to 1000 p.s.i. breaking the gel down to an oil in water emulsion wherein the oil phase comprises oil droplets of fine particle size. In addition to the edible oil, the droplets forming the discontinuous oily phase of the emulsion contains the oil compatible components of the egg yolk containing material. The continuous water phase includes the water compatible components of the egg yolk, Juni agar, agar, Methocel, alginate derivative, starch, salt, mustard flour, onion powder, garlic powder, sodium benzoate, sorbic acid, saccharin, lemon juice concentrate, cider vinegar, white vinegar and antioxidant.

Several important advantages result from the ability to make a mayonnaise-like product with normal mayonnaise characteristics such as body, texture, flavor, color, consistency, etc., but without the necessity of having a high level of edible oil normally used in the manufacture thereof. One advantage of using a lower level of oil is that it is possible to produce mayonnaise-like products of lower calorie content. Secondly, it is possible to produce mayonnaise products more cheaply than has heretofore been possible by reducing the amount of relatively expensive edible oil component. Thirdly, it is possible to provide mayonnaise-like products which are more stable than the usual semi-solid unstable mayonnaise products of the prior art. As is well known, the oil-water emulsions of conventional mayonnaise products tend to separate for many reasons due to transportation, climatic conditions, excessive temperatures, etc. No such separation tendencies exist with the products of this invention. Hence by the present invention there is provided a product which has substantially all of the characteristics of normal mayonnaise products made with substantial amounts of edible oils, but without the serious disadvantages referred to above.

The invention in its broader aspect is not limited to the specific steps, methods, compositions, combinations and improvements described but departures may be made therefrom within the scope of the accompanying claims without departing from the principles of the invention and without sacrificing its chief advantages.

What is claimed is:

1. A novel mayonnaise-like food product of relatively low caloric content which has water as the principal component thereof, comprising an oil in water emulsion wherein the oil phase dispersed throughout the continuous water phase comprises edible oil droplets in an amount from about 5.0 to 30% by weight of the total composition, said emulsion including an egg yolk containing material in an amount from about 1.0 to 7.0% by weight, an acidifying agent in an amount from about 0.1 to 1.5% by weight based on pure acid content, a stiff gum in an amount from about 0.5 to 2.5% by weight, and water in a predominant amount by weight.

2. A novel mayonnaise-like food product of relatively low caloric content according to claim 1, wherein the emulsion contains a soft gum in an amount from about 0.25 to 3.0% by weight.

3. A novel mayonnaise-like food product of relatively low caloric content according to claim 2, wherein the stiff gum is agar-agar and the soft gum is Methocel.

4. The method of forming a novel mayonnaise-like food product of relatively low caloric content which has water as the principal component thereof, comprising forming a hot mix of an edible oil in an amount from about 5.0 to 30% by weight of the total composition, an egg yolk containing material in an amount from about 1 to 7% by weight, an acidifying agent in an amount from about 0.1 to 1.5% by weight based on pure acid content, a stiff gum in an amount from about 0.5 to 2.5% by weight, and water in a predominant amount by weight; cooling the hot mix to the hydrating temperature of the stiff gum to form a gel, and breaking down the gel into an oil in water emulsion wherein the oil phase comprises edible oil droplets.

5. The method of forming a novel mayonnaise-like food product of relatively low caloric content according to claim 4, wherein there is incorporated in the hot mix a soft gum in an amount from about 0.25 to 3.0% by weight.

6. The method of forming a novel mayonnaise-like food product of relatively low caloric content according to claim 5, wherein the stiff gum is agar-agar and the soft gum is Methocel.

References Cited in the file of this patent

UNITED STATES PATENTS

| | | |
|---|---|---|
| 1,385,503 | Snyder | July 26, 1921 |
| 2,168,360 | Musher | Aug. 8, 1939 |
| 2,203,643 | Musher | June 4, 1940 |
| 2,338,083 | Buchanan et al. | Jan. 4, 1944 |